US012627712B2

(12) United States Patent
Narayanaswamy et al.

(10) Patent No.: US 12,627,712 B2
(45) Date of Patent: May 12, 2026

(54) IDENTITY-AWARE SECURE NETWORK

(71) Applicant: ELISITY, INC., San Jose, CA (US)

(72) Inventors: Sundher Narayanaswamy, San Jose, CA (US); Sarath Chandra Bysani, Bangalore (IN); Milan Ramachandran, Bangalore (IN)

(73) Assignee: ELISITY, INC., San Jose, CA (US)

( * ) Notice: Subject to any disclaimer, the term of this patent is extended or adjusted under 35 U.S.C. 154(b) by 366 days.

(21) Appl. No.: 18/118,620

(22) Filed: Mar. 7, 2023

(65) Prior Publication Data

US 2024/0305668 A1 Sep. 12, 2024

(51) Int. Cl.
*H04L 9/40* (2022.01)
(52) U.S. Cl.
CPC ............ *H04L 63/20* (2013.01); *H04L 63/123* (2013.01)
(58) Field of Classification Search
CPC ........ H04L 63/20; H04L 63/123; H04L 63/12
See application file for complete search history.

(56) References Cited

U.S. PATENT DOCUMENTS

| | | | | | |
|---|---|---|---|---|---|
| 4,899,333 | A | * | 2/1990 | Roediger ................ | H04L 12/00 370/427 |
| 6,556,616 | B2 | * | 4/2003 | D'Amico .............. | H04L 1/0061 714/751 |
| 7,016,679 | B2 | * | 3/2006 | Palat ..................... | H04W 92/14 455/433 |
| 7,746,819 | B2 | * | 6/2010 | Skog ..................... | H04L 47/808 370/328 |
| 11,652,822 | B2 | * | 5/2023 | Broda ................. | H04L 63/0218 726/1 |
| 11,943,195 | B1 | * | 3/2024 | Jain ..................... | H04L 63/0272 |
| 2008/0080750 | A1 | * | 4/2008 | Bee .......................... | G06F 21/32 382/124 |
| 2010/0183014 | A1 | * | 7/2010 | Shua ...................... | H04L 63/12 370/395.3 |
| 2021/0112078 | A1 | * | 4/2021 | Huston, III ............. | H04L 63/04 |
| 2021/0160237 | A1 | * | 5/2021 | Rozner ................. | H04L 9/3213 |
| 2022/0201020 | A1 | * | 6/2022 | Aimangala Nagaraja Setty ......... | H04L 63/0236 |
| 2024/0056439 | A1 | * | 2/2024 | Yan ....................... | H04L 67/104 |

OTHER PUBLICATIONS

Garbis et al., Cloud Security Alliance (CSA), "Software-Defined Perimeter (SDP) Specification v2.0", Mar. 2022, vol. 2, pp. 10-36 (Year: 2022).*

* cited by examiner

*Primary Examiner* — Taghi T Arani
(74) *Attorney, Agent, or Firm* — Maschoff Brennan

(57) ABSTRACT

An identity-verification based secure network based on a zero-trust mechanism, is disclosed. The network includes an initiating host (IH), an accepting host (AH), and a software-defined perimeter (SDP) controller. The controller is configured to receive, from the IH, an indication of a source identity, verify a security posture of the source identity based on a stored policy associated with the source identity, and transmit the policy, to the AH, based on the verification. The AH is configured to receive, from the IH, data packets and verify one or more source identities corresponding to each of the received data packets based on a check of each of the one or more source identities against the policy received from the controller. The AH is further configured to transmit one or more of the received data packets, corresponding to the source identity, based on the verification being successful for the source identity.

17 Claims, 4 Drawing Sheets

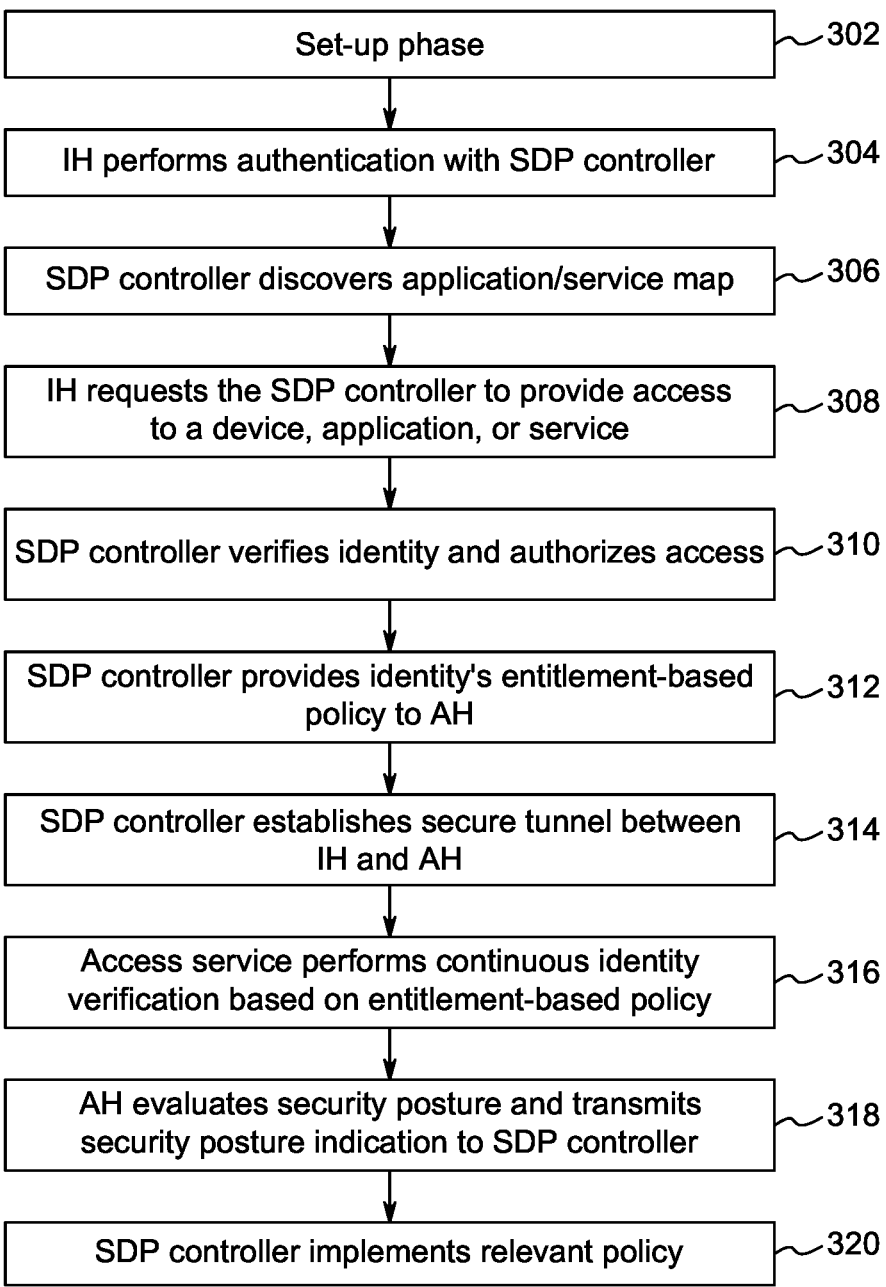

Set-up phase ~302

IH performs authentication with SDP controller ~304

SDP controller discovers application/service map ~306

IH requests the SDP controller to provide access to a device, application, or service ~308

SDP controller verifies identity and authorizes access ~310

SDP controller provides identity's entitlement-based policy to AH ~312

SDP controller establishes secure tunnel between IH and AH ~314

Access service performs continuous identity verification based on entitlement-based policy ~316

AH evaluates security posture and transmits security posture indication to SDP controller ~318

SDP controller implements relevant policy ~320

Processor          402

Memory          404

IDENTITY-AWARE SECURE NETWORK

FIELD OF THE INVENTION

The embodiments discussed in the present disclosure are generally related to providing secure communication in networks. In particular, the embodiments discussed are related to providing secure communication in networks based on a Zero-Trust security mechanism.

BACKGROUND OF THE INVENTION

In a remote working model, a distributed enterprise with its assets spread around multiple disparate and geographically separate domains, presents a large attack surface for a third-party attack. To reduce the attack surface, a Zero-Trust security mechanism includes identity verification of all devices and humans that access resources on a private network. However, a challenge associated with the conventional Zero-Trust security mechanism is that it merely reduces and does not eliminate the attack surface of the enterprise. This may leave the enterprise vulnerable to third-party attacks.

Therefore, there is a need to overcome the above drawback by providing a more secure Zero-Trust security mechanism in a network.

SUMMARY OF THE INVENTION

Embodiments of an identity-verification based secure communication network and a corresponding method are disclosed that address at least some of the above challenges and issues In an embodiment, an identity-verification based secure network is disclosed. The network includes an initiating host (IH), an accepting host (AH), and a software-defined perimeter (SDP) controller. In an embodiment, the controller is configured to receive, from the IH, an indication of a source identity, verify a security posture of the source identity based on a stored policy associated with the source identity, and transmit the policy, to the AH, based on the verification. In an embodiment, the controller may verify the security posture in conjunction with an Endpoint Detection and Response software, which may consider known public security threats to verify the security posture. Additionally, the controller may periodically keep re-evaluating and auto-updating the stored policy associated with the source identity. Further, the AH is configured to receive, from the IH, data packets and verify one or more source identities corresponding to each of the received data packets based on a check of each of the one or more source identities against the policy received from the controller. The AH is further configured to transmit one or more of the received data packets, corresponding to the source identity, based on the verification being successful for the source identity.

In another embodiment, an identity-verification method performed in a secure network, is disclosed. The method includes receiving, by the AH from a controller, a policy based on a verification of a source identity at the controller. The method further includes receiving, from the IH, data packets. The method further includes verifying one or more source identities corresponding to each of the received data packets based on a check of each of the one or more source identities against the policy received from the controller. The method further includes transmitting one or more of the received data packets, corresponding to the source identity, based on the verification being successful for the source identity.

In yet another embodiment, an AH for performing identity-verification in a secure network, is disclosed. The AH includes a processor and a memory that includes computer-executable instructions, which when executed, cause the processor to receive, from a controller, a policy based on a verification of an identity at the controller. The instructions further cause the processor to receive, from the IH, data packets and subsequently, verify one or more source identities corresponding to each of the received data packets based on a check of each of the one or more source identities against the policy received from the controller. The instructions further cause the processor to transmit one or more of the received data packets, corresponding to the source identity, based on the verification being successful for the source identity.

BRIEF DESCRIPTION OF THE DRAWINGS

Further advantages of the invention will become apparent by reference to the detailed description of preferred embodiments when considered in conjunction with the drawings:

FIG. 3 is a flowchart illustrating the steps involved in the identity verification, according to an embodiment.

DETAILED DESCRIPTION

Figure 1:
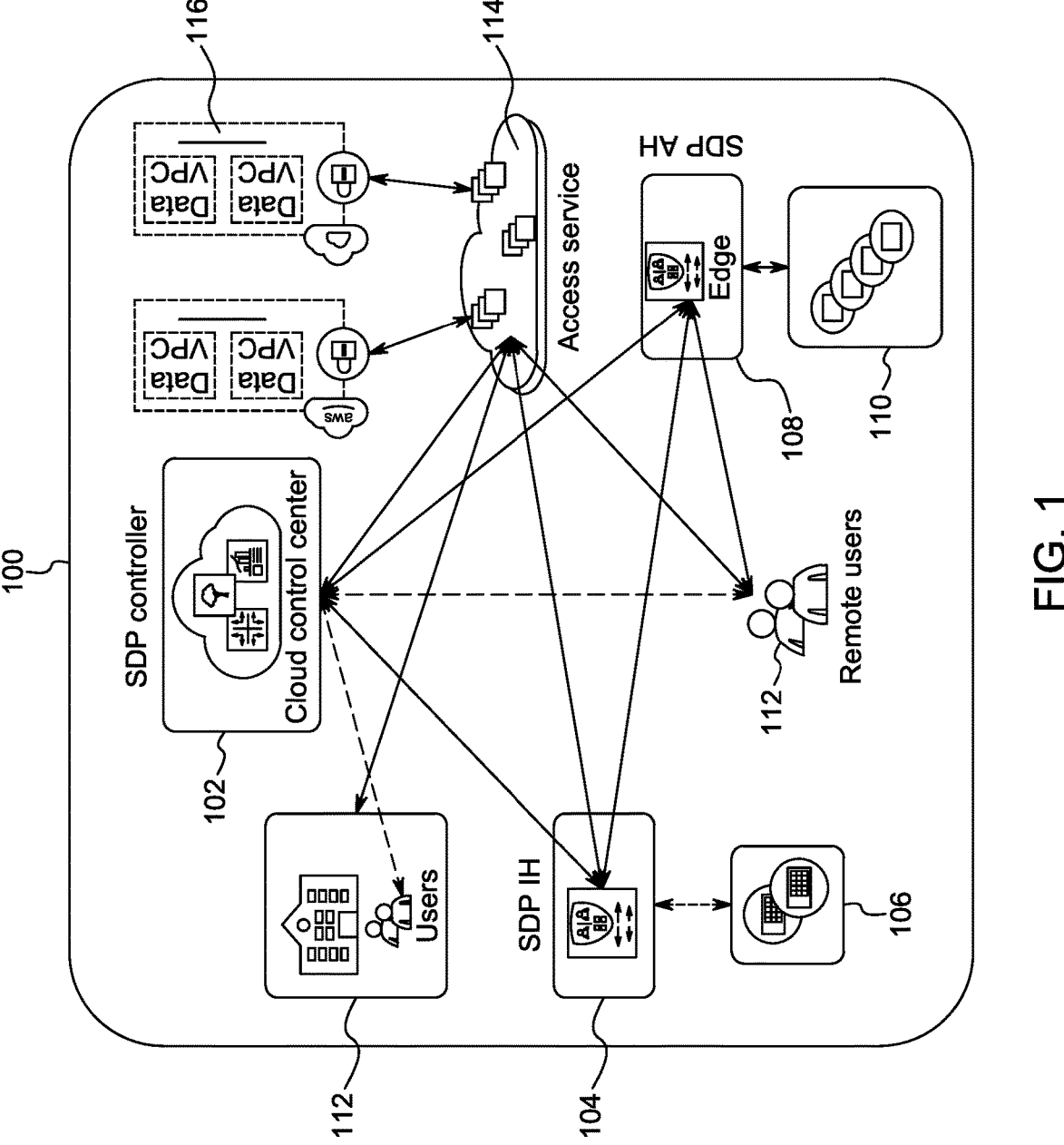
FIG. 1 illustrates a network for implementing disclosed embodiments of a secure communication network, according to an embodiment.

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown but is to be accorded the widest possible scope consistent with the principles and features disclosed herein.

Certain terms and phrases have been used throughout the disclosure and will have the following meanings in the context of the ongoing disclosure.

A "network" may refer to a series of devices or network elements that are interconnected via communication paths. The network may include any number of software and/or hardware elements coupled to each other to establish the communication paths and route data via the established communication paths.

An "enterprise network" may refer to a network owned, leased, and/or managed by customers, which may include one or more business entities. By way of an example, the enterprise network may refer to internal network infrastructure employed by an enterprise or organization to provide connectivity among users, devices, and applications that are local to the enterprise. Therefore, an enterprise network may include one or more internal networks that are located at geographically separate sites.

A "Software-defined perimeter" (SDP) may refer to a logical or software-based perimeter around one or more enterprise networks that may provide services to connect the enterprise networks or their internal networks with each other. The SDP may form a virtual boundary around the enterprise network(s) to restrict access to the enterprise network(s).

An "SDP controller" may refer to a cloud-based logical component of the SDP that determines devices in the enterprise network, which are allowed to connect to each other. The SDP controller may be configured to perform functions such as, but not limited to, policy enforcement, authentication of SDP hosts such as initiating hosts (IHs) and accepting hosts (AHs), determining IHs and AHs that may communicate with each other, and implementing corrective actions to ensure that an enterprise network is secure.

An IH may refer to a gateway device that is deployed on or in vicinity of a source device that intends to access an application(s) or a service(s) hosted on a destination device (or a destination network). For example, the applications or services may be one or more of, but not limited to, a Software-as-a-Service (SaaS) application, a public cloud-based application, a data center-based storage service, and an Internet of Things (IoT) application. Further, the IH acts as the closest policy enforcement device to the source node for enforcing policies on the source node. In one embodiment, the IH may also include an application installed on the source device to implement the above-described functions.

An AH may refer to a gateway device (or an edge device) that is deployed as a guard to protect the service or application hosted on the destination device that the source device intends to access. For instance, the AH may be hosted on an agent in the end user devices, or on network access switches, or as an access service in the network. The AH allows access to the application or service to only those IHs that are authorized by the SDP controller. The AH acts as the closest policy enforcement device to the destination node for enforcing policies on the destination node.

A "zero-trust" security mechanism may refer to a security mechanism employed in the enterprise network, in which no user or device is considered trustworthy by default to access an enterprise network. Each user or device is required to mandatorily verify an associated identity before connecting to another device, application, or service in the enterprise network.

Furthermore, a "data packet" may refer to data or information that is packaged for transmission over a network. The data packet may include a payload portion, a metadata portion, and one or more headers. In one example, the headers may include one or more of, but not limited to, an inner internet protocol (IP) header and an outer IP header. The payload portion may include data (e.g., customer related data) that the source device may intend to transmit to the destination device. Such data included in the payload portion may be sensitive and/or confidential and may need to be protected from any attack or impersonation by external or suspicious parties. Further, the term "data" refers to any type of information, such as but not limited to messages, voice, video, media, or any other information in any appropriate format that may be communicated from one point to another.

For secure communication of data packets through a network, various "encapsulation" techniques defined by the IPsec standard or another known standard, may be implemented to encapsulate the data packets. For instance, the deployed encapsulation techniques may include, but not limited to, an ESP encapsulation as defined by the IPsec standard, a customized ESP encapsulation, and a generic routing encapsulation (GRE). One or more of these techniques may be implemented, either individually or in combination with each other, without departing from the scope of the ongoing description.

In order to further enhance the security of the data packet, one or more "encryption" techniques may also be implemented. For instance, encryption techniques such as, but not limited to, an ESP encryption as defined by the IPsec standard, a customized ESP encryption, an Advanced Encryption Standard (AES) encryption, a Data Encryption Standard (DES) encryption, and Triple-DES encryption may be implemented to encrypt the data packet.

The embodiments of the methods and systems are described in more detail with reference to FIGS. 1-4.

FIG. 1 illustrates a network 100, in accordance an embodiment. The network 100 may be in communication with one or more enterprise networks (not shown) associated with one or more enterprises. In an embodiment, the network 100 may include an SDP controller 102, an IH 104 deployed on or in vicinity of a source device 106, and an accepting host (AH) 108 deployed on or in vicinity of a destination device 110 that hosts one or more applications or services. In one example, IH 104 and the source device 106 may be in communication with each other and associated with one enterprise network. Further, the AH 108 and the destination device 110 may be in communication with each other and associated with another enterprise network. In another example, the IH 104 and the source device 106 may be located at one geographical site of an enterprise network while the AH 108 and the destination device 110 may be located at another geographical site of the same enterprise network.

The network 100 may also include an access service 114 associated with one or more data centers 116. The access service 114 may be included in the AH 108 or may be an external service. The access service 114 may be orchestrated by the SDP controller 102. In an embodiment, the access service 114 may perform continuous identity verification of incoming data packets (e.g., to the AH 108) and policy enforcement for the AH 108. In an embodiment, the continuous identity verification may be performed dynamically through information carried in a header of each packet that traverses the access service 114.

Further, the network 100 may also include one or more users 112 that may be associated with the source device 106 and may attempt to access the applications or services hosted on the destination device 110. However, a person skilled in the art would understand that any network policies may be applied either at the user level and/or the device level for the device(s) being used by the user. The invention is not limited, in any manner, with respect to the policy application and enforcement.

Figure 2:
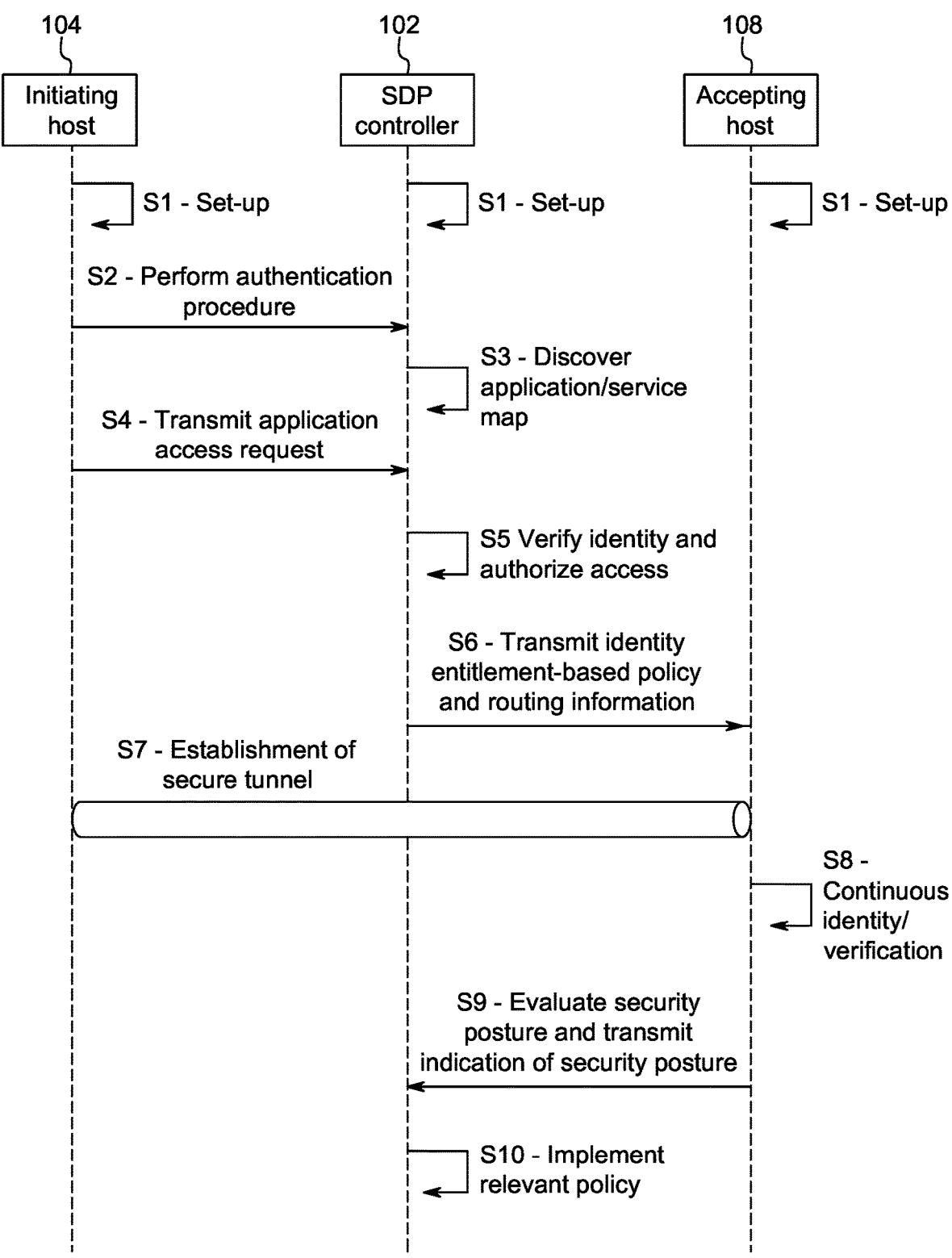
FIG. 2 is a signal flow diagram to illustrate a method for identity verification, according to an embodiment.

FIG. 2 is a signal flow diagram illustrating the steps involved in the identity verification, according to an embodiment.

Step S1 of the illustrated method in FIG. 2, may include a "set-up phase." In the set-up phase, all devices in the network (e.g. network 100) may be, after being switched on, configured for implementing the steps of the illustrated method, as discussed later in this disclosure. In an embodiment, the SDP controller 102 may be configured to discover other devices in the network 100. For example, the SDP controller 102 may be configured to discover the IH 104 and the AH 108 by implementing any known device discovery mechanisms. Similarly, the IH 104 and the AH 108 may also discover the SDP controller 102 using known device discovery mechanisms. The IH 104 and the AH 108 may then establish their respective control channels with the SDP controller 102 for control plane communication.

In step S2, the IH 104 may perform an authentication procedure with the SDP controller 102. In this step, IH 104 may transmit an authentication request to the SDP controller 102, which may then authenticate and/or authorize the IH 104 based on one or more policies stored in the SDP controller 102. For instance, the SDP controller 102 may have stored authentication and/or authorization policies using which, the SDP controller 102 may authenticate and/or authorize the IH 104, once the authentication request is received by the SDP controller 102.

In an embodiment, the IH 104 may perform the authentication procedure with the SDP controller 102 over the control channel established between the SDP controller 102 and IH 104.

In step S3, the SDP controller 102 discovers a service/application mapping. For instance, in this step, the SDP controller 102 may discover the services or applications available in the network 100 and map the discovered services or applications with their corresponding virtual internet protocol (IP) addresses, for further communication. In another embodiment, the SDP controller 102 may create a service/application mapping based on an input provided by an operator. For instance, an operator of the SDP controller 102 may manually provide to the SDP controller 102, a list of devices and associated services or applications supported by such devices. The SDP controller 102 may then store a mapping between these devices and their associated services or applications. This process may be referred to as "device onboarding" or "application onboarding."

In step S4, the IH 104 may transmit an application access request to the SDP controller 102. In an embodiment, the IH 104 may have received the application access request from the source device (e.g. source device 106) that intends to access a specific application or service hosted on the destination device (e.g. destination device 110). In an embodiment, one or more software modules on the source device may create the application access request and transmit it to IH 104. A person skilled in the art would understand that the access request may also include a request to access more than one application or service, the presented embodiments are not limited by the number of applications or services that need to be accessed.

As part of the application access request, the IH 104 may request the SDP controller 102 to authorize the source device, or a user or application associated with the source device to access a service or an application associated with the destination device. In an embodiment, the application access request may also include an indication of a source identity associated with an application, a user, or the source device. In one example, the source identity of a user may identify a user that uses the source device and the source identity of an application may identify an application executed on the source device.

In an exemplary scenario, the user may be an enterprise user, contractor or a partner personnel who temporarily needs to access the enterprise resources. The source device may be any enterprise owned physical device or the enterprise user's device. This device may also include enterprise service devices such as, but not limited to, Dynamic Host Configuration Protocol (DHCP) Server, Radius Server, Build Servers, Print Servers, and Printers. The application that the source device needs to access may be any enterprise specific application such as, but not limited to, a finance application, a human resources (HR) Application, a Secure Shell (SSH) application any known Layer 7 application.

In step S5, the SDP controller 102 may fingerprint the source identity by obtaining it from the application access request and verify it based on one or more entitlement parameters. These parameters may also be referred to as hash parameters and may include, but not limited to, the identity (of the user, source device, or application requesting access), a session identity, an application access key, and an entitlement privilege associated with the corresponding identity. In an exemplary scenario, the source device/user is provided with a hash map of information related to their credentials, which specifics their access map to enterprise resources. This hash can be securely seen by decrypting the key, which is available only for the users, SDP controller and the access service nodes. The user/device when sending packets to access enterprise resources, may send the encrypted information in the packet header. The access service decrypts it and accesses their entitlement before allowing the packets to go through to access the destination application.

Further, the application access key may include a unique function of a hash, derived from one or more other hash parameters. Further, the entitlement privilege may include an access privilege allowed for the identity. The session identity includes an identity associated with a session established between the IH 104 and AH 108.

Herein, the fingerprinting of a user identity may involve accurately identifying users, devices, and application at a granular level. The users may be fingerprinted (i.e., accurately identified) by identifying one or more of, but not limited to, their user identity (ID), a location of the user their role within the enterprise, their organization within the enterprise (such as Engineering organization, and within Engineering organization-Development organization or Quality Analyst organization etc.).

In a similar manner, devices used by the users may also be fingerprinted. For instance, fingerprinting the devices may include identifying a type of the device, an Operating System (OS) running installed on the device, a version of OS/software/firmware on the device, a geographical location of the device, one or more user activity related time intervals on the device, and so on.

Similarly, the applications may also be fingerprinted by using parameters related to the corresponding application. For instance, an application may be fingerprinted by identifying one or more of, but not limited to, a server on which the application is running, a specific Layer 4 port the application is using, one or more types of access patterns seen for the application, and so on.

Further, the SDP controller 102 may have a stored policy based on which, it may determine whether the source identity should be verified successfully or not. In an embodiment, this may involve verifying a security posture of the source identity. If the identity verification is not successful, the SDP controller 102 may reject the application access request. However, if the identity verification is successful i.e., the security posture is successfully verified based on the stored policy, the SDP controller 102 may authorize the application access request received in step S4. In an embodiment, the source identity may be authorized regardless of a type or location of the application for which, the SDP controller 102 receives the application access request. Therefore, the user, device, and/or application may be accordingly authorized to access the destination device and the associated services or applications.

Once the identity verification is complete, the SDP controller 102 transmits this stored identity entitlement-based policy and routing information to the AH 108 via the corresponding control channel, in step S6. Here, this routing information may be used by intermediate nodes between the IH 104 and the AH 108 to enable data packets transmission, from the IH 104 to the AH 108 (or the access service 114). Similarly, the SDP controller 102 may transmit the routing information for enabling the reverse path, for packets returning from the AH 108 to the IH 104. In an embodiment, the identity entitlement-based policy may include the one or more entitlement parameters (or hash parameters) such as, but not limited to, the identity of the user, device, or application requesting access, the session identity, the application access key, and the entitlement privilege. These parameters may be later used by the AH 108 for continuous identity verification of incoming data packets from the IH 104.

In step S7, the SDP controller 102 may establish a dynamic secure tunnel between IH 104 and AH 108 for data plane communication. For instance, IH 104 may receive data packets from the source device and transmit the received data packets to AH 108 via the secure tunnel. Here, the secure tunnel may be created dynamically, that is, on-demand based on a known data-flow trigger and/or a security posture. In an embodiment, each data packet transmitted via the secure tunnel may include a source identity of the source device and IH 104, a session identity of a current session between the IH 104 and the AH 108, an application access key associated with the application hosted on the destination device, that the source device intends to access, and an entitlement privilege associated with the source device and/or AH 108. Therefore, the embodiments presented herein enable the secure tunnel to be application-aware and identity-aware, which further enables later verification of the associated application and identity at AH 108.

A person skilled in the art would understand an identity of the 'source device' intending to access an application on the destination device may include an identity of one or more of a device used by the user, an application hosted on or running on the source device, or the source device itself. Any references to the term 'source device' in this disclosure are not restricted to only the hardware device used by the user but may include the above expressions as well. For instance, one or more of the user, an application running on the source device, or the source device may intend to access, for instance, an enterprise application hosted on the destination device, in accordance with the embodiments and the above-described method applies to any interpretation of the term 'source device'.

In step S8, the AH 108 may perform a continuous verification of the data packets received over the secure tunnel. In an embodiment, the continuous verification of the data packets refers to verification of user/device/application's source identity carried in each packet i.e., a verification that matches their access credentials to each enterprise application or resources they have access to. This happens for each packet that is sent by the user-device to access enterprise resource. In an embodiment, the AH 108 may perform the continuous verification based on the identity entitlement-based policy received in step S6. In this step, the AH 108 may determine whether an incoming data packet is authorized to access a device by verifying the source identity associated with each received data packet, application or service associated with the AH 108 or not. For example, the AH 108 may check source identities corresponding to all the received data packets against the policy received from the SDP controller to continuously verify these source identities. If the data packet is not authorized i.e., the verification of the corresponding source identity is not successful, the AH 108 may discard the data packet and therefore, prevent the source device or the IH 104 from accessing the destination device and the associated applications or services that are protected. However, if the data packet is authorized because of the verification of the corresponding source identity being successful, the AH 108 may allow the data packet associated with the verified source identity to be transmitted further to the destination device to enable the source device to access the associated application of services.

In step S9, the AH 108 may evaluate a security posture associated with the identity and provide an indication to the SDP controller 102 if it detects a modification in security posture. Here, the security posture indicates a health of the identity. For example, if the identity is compromised or infected, the SDP controller 102 would know that information by its integration with an endpoint detection and response software (EDR). The health of the identity is pushed to the AHs/Access Service along with the information regarding any restricted access, at a particular health score. The AHs/access service may then verify that information for each packet before allowing the packets to go through to access the application hosted on the destination device.

In an exemplary scenario, the EDR is considered as an essential part of Endpoint protection. Central to EDR is the detection of attackers that may evade the prevention layer of Endpoint protection. EDR tools are technology platforms that may alert security teams in an enterprise, of malicious activity, and enable fast investigation and containment of attacks on endpoints. An endpoint can be an employee workstation or laptop, a server, a cloud system, a mobile or IoT device. EDR solutions typically aggregate data on endpoints including process execution, endpoint communication, and user logins; analyze data to discover anomalies and malicious activity; and record data about malicious activity, enabling the security teams to investigate and respond to incidents.

Additionally, the controller may periodically keep re-evaluating and auto-updating the stored policy associated with the source identity. For example, there may be a policy on the controller that allows certain endpoints to communicate based on certain health threshold of the endpoints. Whenever a health-level based on the data from the EDR for one or more of the communicating endpoints falls below the specified threshold in the policy, the previously "allowed communication" changes to "communication disallow" as soon as the change is detected. Once the endpoint is rectified, and the health score goes above the threshold as gleaned from the EDR, the communication between the endpoints is allowed by the controller. In essence, based on the health score, the controller may push communication allow/disallow policy rules to the AHs.

In an embodiment, a modified security posture may indicate that an identity associated with the source device or an associated application is compromised because of a third-party attack. The modified security posture may also indicate that a user associated with the source device is not authorized to access the destination device. The SDP controller 102 may then determine whether a policy is available for the modified security posture. The SDP controller 102 may accordingly implement the relevant policy to take a corrective measure. For example, the data packets incoming from the source device via AH 108 may be discarded or prevented from accessing the destination device.

In another embodiment, a software module on the destination device may perform continuous security posture evaluation of the identity associated with the source device or application. The destination device then pushes one or more hash parameters into a pre-established secure tunnel between the IH 104 and the AH 108.

Therefore, the embodiments presented herein enable verification of an identity of a user, device, or application that intends to access a protected device, application, or service during a data plane session before allowing the access to the user, device, or application. This eliminates the attack surface in an enterprise by eliminating any probability of compromised devices or applications, or unauthorized third-party attackers to access protected devices, applications, or services.

FIG. 3 is a flowchart illustrating the steps involved in the identity verification, according to an embodiment. The steps illustrated in FIG. 3 are performed in a similar manner as the corresponding steps described in the context of FIG. 2. Therefore, the steps illustrated in FIG. 3 are not explained again for brevity.

Referring to FIG. 3, in step 302, all devices in the network (e.g. network 100) may be configured (set-up) for implementing the steps of the illustrated method. In step 304, the IH performs authentication with the SDP controller. In step 306, the SDP controller creates or discovers an application/service map associated with the network. In step 308, the IH requests the SDP controller to provide access to a specific device, application, or service. In step 310, the SDP controller verifies a source identity associated with the specific device, application, or service and authorizes the requested access. In step 312, the SDP controller provides entitlement-based policy associated with the source identity to the AH based on verification of the source identity by the SDP controller. In step 314, the SDP controller establishes a dynamic secure tunnel between the IH and the AH. In step 316, an access service associated with the AH performs continuous identity verification of all source identities corresponding to the received data packets based on the entitlement-based policy received from the controller. If the verification of a particular source identity is successful, the AH transmits the corresponding data packet to the destination device. In step 318, the AH evaluates a security posture and transmits a security posture indication to the SDP controller. In step 320, the SDP controller implements a relevant policy based on the indication that there is a modification to the security posture.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 4:
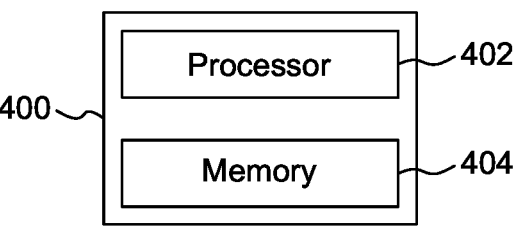
FIG. 4 illustrates an exemplary device, according to an embodiment.

FIG. 4 illustrates an exemplary device 400, according to an embodiment. The exemplary device may be any device included in the network 100. For example, the device 400 may be the SDP controller 102, the IH 104, the AH 108, the source device 106, or the destination device 110. The device 400 may at least include a processor 402 and a memory 404. The memory 404 may include computer-executable instructions, which when executed, cause the processor to perform the steps described in the context of FIGS. 2 and 3 to implement the presented embodiments.

In view of the above description, the embodiments presented herein enable the carrying of session-based identity information along with its security posture and the identity's application access credentials, from the source device to the destination device during the session. The embodiments presented herein also enable a data-plane function that performs a continuous vetting (verification) of the identity over the application access session and implement necessary action when the vetting fails. In the conventional network security mechanism, a solution that enables the above aspects, does not exist.

In an embodiment, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

The terms "comprising," "including," and "having," as used in the claim and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition, or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation. Additionally, it should be understood that the various embodiments of the networks, devices, and/or modules described herein contain optional features that can be individually or together applied to any other embodiment shown or contemplated here to be mixed and matched with the features of such networks, devices, and/or modules.

While the invention has been described with respect to a limited number of embodiments, those skilled in the art, having benefit of this disclosure, will appreciate that other embodiments can be devised which do not depart from the scope of the invention as disclosed herein.

We claim:

1. An identity-verification based secure network, comprising:

an initiating host (IH);

an accepting host (AH); and a controller, wherein the controller is configured to:

receive, from the IH, an indication of a source identity;

verify a security posture of the source identity based on a stored policy associated with the source identity; and transmit the policy, to the AH, based on the verification, and wherein the AH is configured to:

receive, from the IH, data packets via a secure tunnel established between the IH and the AH;

verify one or more source identities corresponding to each of the data packets, received over the secure tunnel, based on a check of each of the one or more source identities against the policy received from the controller; and transmit one or more of the received data packets, corresponding to the source identity, based on the verification being successful for the source identity.

2. The network of claim 1, wherein the source identity is associated with one of a source device, an application hosted on the source device, and a user using the source device.

3. The network of claim 1, wherein the IH is configured to transmit an access request to the controller to authorize the source identity to access one or more of an application and a service hosted on a destination device, and further, wherein the access request comprises the indication of the source identity.

4. The network of claim 1, wherein the policy comprises one or more hash parameters comprising one or more of:

the source identity, wherein the source identity identifies one of a source device, an application, and a user that intends to access one of an application and a service hosted on a destination device associated with the AH;

a session identity associated with a session established between the IH and the controller;

an application access key that comprises a hash function associated with the source identity; and an entitlement privilege indication that indicates access level allowed for the source identity.

5. The network of claim 1, wherein the controller is further configured to:

compare one or more parameters associated with the source identity with one or more corresponding hash parameters in the stored policy to verify the security posture of the source identity; and transmit, to the AH, at least the stored policy based on the comparison indicating a positive result.

6. The network of claim 1, wherein the IH is configured to transmit an access request to the controller to authorize the source identity to access one or more of an application and a service hosted on a destination device.

7. The network of claim 1, wherein the controller is further configured to transmit the policy and a routing information via a control channel established between the controller and the AH and further, wherein the routing information is usable by one or more nodes to route the data packets via a secure tunnel established between the IH and the AH.

8. The network of claim 1, wherein the AH is configured to authorize the source identity associated with the one or more of the received data packets based on the verification being successful for the source identity, wherein the authorization comprises allowing the source identity to access one or more of an application and a service hosted on a destination device associated with the AH.

9. The network of claim 1, wherein the controller is configured to periodically update the stored policy based on one or more public security threats associated with one or more endpoint devices in the network.

10. The network of claim 1, wherein the AH is further configured to:

periodically evaluate a security posture associated with the source identity;

determine an occurrence of a modification in the security posture; and transmit, to the controller, the security posture indication of the modified security posture.

11. The network of claim 10, wherein the controller is further configured to:

determine another policy comprising one or more corrective actions based on the received security posture indication; and implement the determined policy.

12. An identity-verification method performed in a secure network, comprising:

receiving, by an accepting host (AH) from a controller, a policy based on a verification of a source identity at the controller;

receiving, from an initiating host (IH), data packets via a secure tunnel established between the IH and the AH;

verifying one or more source identities corresponding to each of the data packets, received over the secure tunnel, based on a check of each of the one or more source against the policy received from the controller; and transmitting one or more of the received data packets, corresponding to the source identity, based on the verification being successful for the source identity.

13. An accepting host (AH) for performing identity-verification in a secure network, the accepting host comprising:

a processor; and a memory comprising computer-executable instructions, which when executed, cause the processor to:

receive, from a controller, a policy based on a verification of a source identity at the controller;

receive, from an initiating host (IH), data packets via a secure tunnel established between the IH and the AH;

verify one or more source identities corresponding to each of the data packets, received over the secure tunnel, based on a check of each of the one or more source identities against the policy received from the controller; and transmit one or more of the received data packets, corresponding to the source identity, based on the verification being successful for the source identity.

14. The host of claim 13, wherein the policy comprises one or more hash parameters comprising one or more of:

the source identity, wherein the source identity identifies one of a source device, an application, and a user that intends to access one of an application and a service hosted on a destination device associated with the AH;

a session identity associated with a session established between the IH and the controller;

an application access key that comprises a hash function associated with the source identity; and an entitlement privilege indication that indicates access level allowed for the source identity, wherein the source identity is associated with one of a source device, an application hosted on the source device, and a user using the source device.

15. The host of claim 13, wherein the source identity is associated with one of a source device, an application hosted on the source device, and a user using the source device.

16. The host of claim 13, wherein the processor is configured to authorize the source identity associated with the one or more of the received data packets based on the verification being successful for the source identity, wherein the authorization comprises allowing the source identity to access one or more of an application and a service hosted on a destination device associated with the AH.

17. The host of claim 13, wherein the processor is further configured to:

periodically evaluate a security posture associated with the source identity;

determine an occurrence of a modification in the security posture; and transmit, to the controller, the security posture indication of the modified security posture.

* * * * *